United States Patent
Martin-Bale et al.

(10) Patent No.: US 10,616,308 B2
(45) Date of Patent: Apr. 7, 2020

(54) SYSTEMS AND METHODS FOR HARMFUL FILE RATING AND SCREENING IN ONLINE FILE TRANSFERS

(71) Applicant: LAVASOFT SOFTWARE CANADA INC., Ville St-Laurent (CA)

(72) Inventors: Alexander Martin-Bale, Ville St-Laurent (CA); Daniel Assouline, Ville St-Laurent (CA)

(73) Assignee: LAVASOFT SOFTWARE CANADA INC., Ville St-Laurent, QC (CA)

(*) Notice: Subject to any disclaimer, the term of this patent is extended or adjusted under 35 U.S.C. 154(b) by 68 days.

(21) Appl. No.: 15/372,694

(22) Filed: Dec. 8, 2016

(65) Prior Publication Data

US 2017/0163605 A1 Jun. 8, 2017

Related U.S. Application Data

(60) Provisional application No. 62/264,715, filed on Dec. 8, 2015.

(51) Int. Cl.
*H04L 29/06* (2006.01)
*H04L 29/08* (2006.01)
*G06F 21/50* (2013.01)

(52) U.S. Cl.
CPC .............. *H04L 67/06* (2013.01); *G06F 21/50* (2013.01); *H04L 63/1466* (2013.01); *H04L 67/02* (2013.01); *H04L 67/104* (2013.01); *H04L 67/125* (2013.01); *H04L 67/2819* (2013.01); *H04L 67/42* (2013.01)

(58) Field of Classification Search
CPC ....... H04L 67/06; H04L 67/125; H04L 67/02; H04L 67/1466; H04L 67/2819; H04L 67/42; H04L 67/104; G06F 21/50
See application file for complete search history.

(56) References Cited

U.S. PATENT DOCUMENTS

| | | | |
|---|---|---|---|
| 8,627,463 B1* | 1/2014 | Glick ...................... | H04L 63/12 726/22 |
| 2005/0198061 A1* | 9/2005 | Robinson ............... | H04L 67/104 |
| 2011/0219448 A1* | 9/2011 | Sreedharan ............. | G06F 21/00 726/23 |
| 2012/0066346 A1* | 3/2012 | Virmani .............. | G06F 17/3012 709/219 |
| 2015/0201250 A1* | 7/2015 | Yaroshenko .......... | H04L 67/306 725/35 |
| 2015/0334125 A1* | 11/2015 | Bartos ................. | H04L 63/1416 726/24 |

* cited by examiner

*Primary Examiner* — Matthew T Henning
(74) *Attorney, Agent, or Firm* — Kilpatrick Townsend & Stockton LLP

(57) ABSTRACT

A computing device identifies a torrent identifier for a torrent file, where the torrent file is associated with content to be processed at the computing device. The computing device uses the torrent identifier to search a data store containing data indicating characteristics of the content associated with the torrent file. Where the search locates data indicating characteristics of the content associated with the torrent file in the data store, the computing device controls whether to process the content associated with the torrent file at the computing device based on the located data.

27 Claims, 5 Drawing Sheets

SYSTEMS AND METHODS FOR HARMFUL FILE RATING AND SCREENING IN ONLINE FILE TRANSFERS

CROSS-REFERENCE TO RELATED APPLICATIONS

This application claims priority to U.S. provisional patent application No. 62/264,715, filed on Dec. 8, 2015, the entire contents of which is incorporated by reference herein.

FIELD OF THE DISCLOSURE

The present disclosure relates generally to systems and methods for providing security on computing devices, and specifically, to systems and methods for harmful file rating and screening in online file transfers.

BACKGROUND

When performing online file transfers using peer-to-peer file transfer protocols (e.g., such as BitTorrent™), computing devices are vulnerable to security risks associated with the content being downloaded and processed.

In the BitTorrent™ file distribution system, each file to be downloaded is divided into small information chunks called pieces or portions. These pieces are distributed amongst a number of peers, which collectively, are called a swarm. The computing device desiring to download the file may simultaneously request multiple pieces from different computers in the swarm. Upon being downloaded, these pieces may be made available for download by others in the swarm. Once all the pieces are obtained by the computing device, they can be re-assembled to form the original file or content desired.

The BitTorrent™ protocol provides for a metadata file called a torrent file (e.g., with a .torrent file extension) that contains information about the content to be downloaded. This metadata may include the file names, sizes, folder structure, and cryptographic hash values (e.g., for verifying file integrity) of the content. The torrent file is associated with the content to be downloaded, but it does not contain the content itself.

To assist the computing device initialize a connection with other computing devices in a swarm, the torrent file may include information about the network locations of trackers. Trackers are network computers that assist computing devices find each other and form efficient swarms.

To initialize participation in a swarm for downloading desired content, a computing device may first obtain the corresponding torrent file by downloading it. Then, the computing device may be configured to have a BitTorrent™ client application process the torrent file. To learn the Internet locations of peers which may be sharing pieces, the client application connects to the trackers named in the torrent file (e.g., by providing a hash of the torrent to the tracker so that the tracker can identify the torrent file). Then the client connects directly to the peers in order to request pieces participate in a swarm. The client may also report progress to trackers, to help the tracker with its peer recommendations.

There are variations to the how the BitTorrent™ protocol may operate. For example, some torrents may be considered "trackerless". In such configurations, trackers may not be required to provide the Internet locations of peers in the swarm. Instead, peers in the swarm may be stored as information in a Distributed Hash Table (DHT), and the hash of the torrent file may be used as a key in an entry of the DHT. The torrent client application may be part of a DHT network, so it may generate a hash of the torrent file and use it as a key to look up values for Internet locations of peers in the swarm in the DHT.

In another configuration, a torrent file need not be directly downloaded and processed by the torrent client. Instead, a "magnet link" that incorporates the hash of the torrent file may be included directly into the Uniform Resource Identifier (URI) or Uniform Resource Locator (URL) that may be processed by a web browser on the computing device. Upon a magnet link being opened in the web browser, the computing device may directly open the torrent client application available thereon. Using the hash of the torrent embedded in the magnet link, the torrent client application can then access the DHT to look up the Internet locations of participants in the swarm to start downloading pieces of the desired content.

Due to the nature of peer-to-peer file sharing, computing devices requesting to download content associated with a torrent file are often unfamiliar with the party that originally seeded the content, nor the computing devices of the swarm which they are downloading the content from. This creates increased security risks that the content ultimately downloaded may be malicious or harmful. There is thus a need for improved systems and methods for harmful file rating and screening in online file transfers.

BRIEF DESCRIPTION OF THE DRAWINGS

Non-limiting examples of various embodiments of the present disclosure will next be described in relation to the drawings, in which.

DETAILED DESCRIPTION

Figure 1:
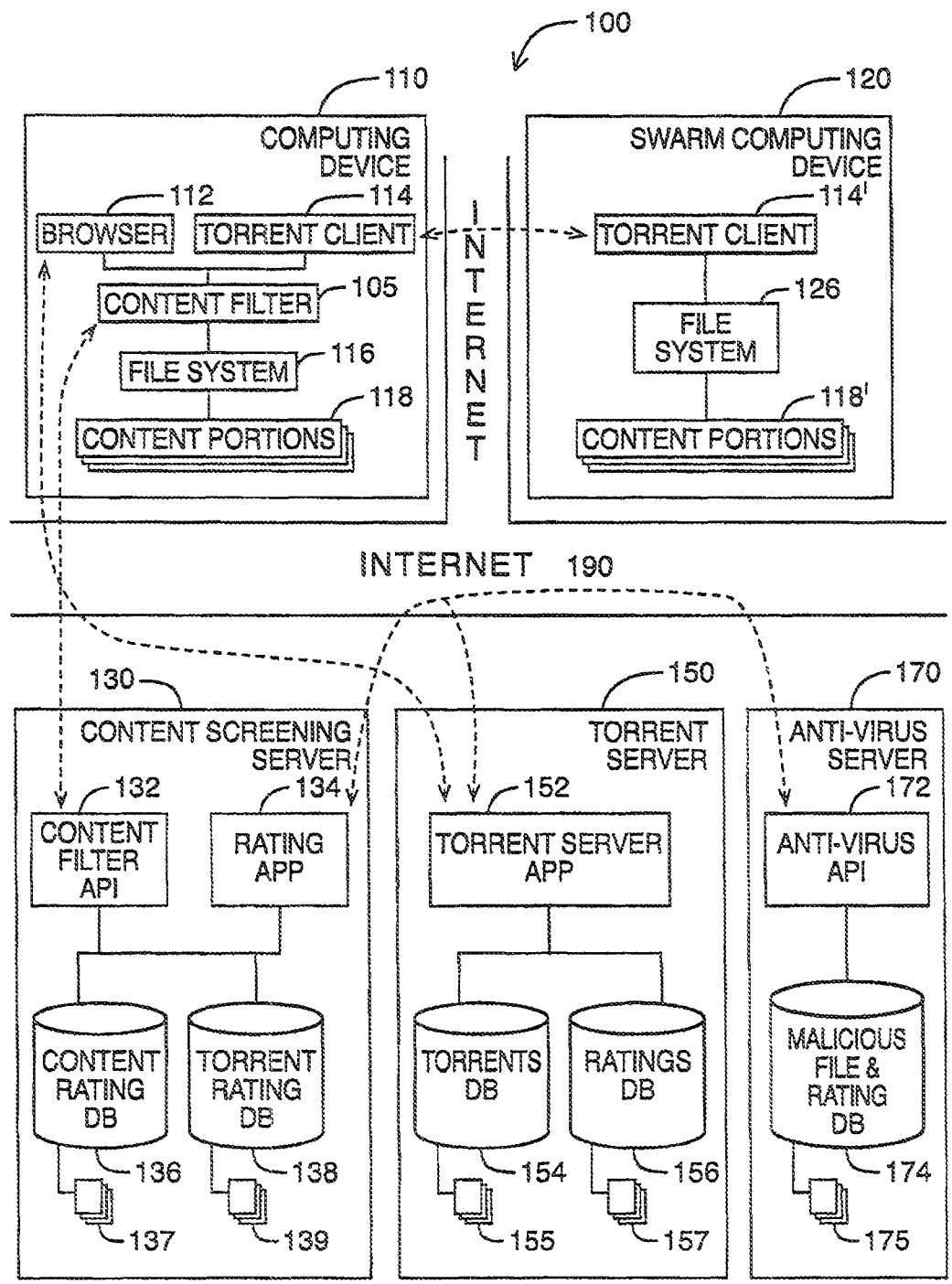
FIG. 1 is a block diagram of a system for screening files during online file transfers, in accordance with at least one embodiment of the present invention.

In a first broad aspect of the present disclosure, there is provided a method of screening files during online file transfers at a computing device. The method includes: identifying a torrent identifier for a torrent file, the torrent file being associated with content to be processed at the computing device; using the torrent identifier to search a data store, the data store having data indicating characteristics of the content associated with the torrent file, wherein the search locates the data indicating characteristics of the content associated with the torrent file in the data store; and based on the located data, controlling whether to process the content associated with the torrent file at the computing device.

In some embodiments, the data store is provided at a server, and to search the data store using the torrent identifier, the method further includes: transmitting the torrent identifier to the server, wherein the server is configured to determine the data indicating characteristics of the content associated with the torrent file in the data store, for transmission to the computing device; and receiving, from the server, the data indicating characteristics of the content associated with the content file. In some embodiments, the data store is provided at the computing device.

In some embodiments, the torrent identifier is detected on a webpage received from a web server. In some embodiments, the identifying the torrent identifier includes intercepting a request to download the torrent file initiated at the computing device, and wherein the request includes the torrent identifier. In some embodiments, the request is initiated using a web browser on the computing device, and the intercepting is performed by the web browser determining that a Uniform Resource Identifier (URI) or Uniform Resource Locator (URL) to be processed for the request includes the torrent identifier. In some embodiments, the intercepting is performed by a firewall prior to the request reaching a destination computing device from which the torrent file can be downloaded.

In some embodiments, the identifying the torrent identifier includes: scanning downloaded files for the torrent file, the scanning being performed based on file properties of the downloaded files; and upon locating the torrent file, parsing the torrent file for the torrent identifier. In some embodiments, the file properties used to perform the scanning include the Internet media (MIME) type of the downloaded files.

In some embodiments, the data indicating characteristics of the content associated with the torrent file includes information indicating whether the content is safe for download to the computing device. In some embodiments, the content associated with the torrent file includes a media file, and wherein the data indicating characteristics of the content includes information indicating the playback quality of the media file.

In some embodiments, the data indicating characteristics of the content associated with the torrent file is derived from a plurality of external torrent servers providing access to the torrent file. In some embodiments, the method further includes: scanning the external torrent servers to obtain respective rating information for the content associated with the torrent file; and generating a combined rating for the content associated with the torrent file, based on the respective rating information obtained from the external torrent servers. In some embodiments, the combined rating includes an average of the respective rating information obtained from the external torrent servers. In some embodiments, the method further includes: determining an age of the rating information obtained from the external torrent servers; and wherein, the combined rating includes a weighted average of the respective rating information obtained from the external torrent servers, with older rating information being weighted more heavily in the weighted average.

In some embodiments, the torrent file includes an 'info' portion, and the torrent identifier includes an 'info_hash' of the 'info' portion. In some embodiments, the torrent identifier includes a hash of the torrent file.

In some embodiments, the method further includes: identifying a content identifier associated with the content to be downloaded to the computing device; using the content identifier to perform a search for additional data that indicates characteristics of the content associated with the torrent file, wherein the search locates the additional data indicating characteristics of the content associated with the torrent file; wherein, the controlling whether to process the content at the computing device is performed in part based on the additional data. In some embodiments, the content identifier includes a hash of the content associated with the torrent file. In some embodiments, the content identifier is embedded within the torrent file, and the identifying the content identifier includes parsing the torrent file to locate the content identifier. In some embodiments, the content associated with the torrent file is downloaded to the computing device, and the identifying the content identifier includes deriving the content identifier from the downloaded content. In some embodiments, the additional data is derived from a plurality of external anti-virus servers configured to return information about the characteristics of the content based on the content identifier.

In some embodiments, the data indicating characteristics of the content, as determined from the torrent identifier, and the additional data indicating characteristics of the content, as determined from the content identifier, have overlapping information.

In some embodiments, the content associated with the torrent file includes a plurality of files, and wherein the data indicating characteristics of the content includes a plurality of rating information that are each associated with a corresponding file of the plurality of files.

In some embodiments, the controlling whether to process the content includes determining whether to download the content to the computing device. In some embodiments, the controlling whether to process the content includes determining whether to open the content after the content has been downloaded to the computing device.

In another broad aspect of the present disclosure, there is provided a method of screening files during online file transfers at a server, the method includes the server: receiving a torrent identifier for a torrent file from a computing device, the torrent file being associated with content to be processed at the computing device; determining, using the torrent identifier, data indicating characteristics of the content associated with the torrent file; and transmitting the data indicating characteristics of the content associated with the torrent file to the computing device, wherein based on the transmitted data, the computing device controls whether to process the content associated with the torrent file at the computing device.

In another broad aspect of the present disclosure, there is provided a computing device having a processor and a memory storing instructions for screening files during online file transfers, wherein when the instructions are executed by the processor, the processor: identifies a torrent identifier for a torrent file, the torrent file being associated with content to be processed at the computing device; uses the torrent identifier to search a data store, the data store having data indicating characteristics of the content associated with the torrent file, wherein the search locates the data indicating characteristics of the content associated with the torrent file in the data store; and based on the located data, controls whether to process the content associated with the torrent file at the computing device.

In some embodiments, the data store is provided at a server, and to search the data store using the torrent identifier, and the processor is further configured to: transmit the torrent identifier to the server, wherein the server is configured to determine the data indicating characteristics of the content associated with the torrent file in the data store, for transmission to the computing device; and receive, from the server, the data indicating characteristics of the content associated with the content file. In some embodiments, the data store is provided at the computing device.

In some embodiments, the torrent identifier is detected on a webpage received from a web server. In some embodiments, the identifying the torrent identifier includes intercepting a request to download the torrent file initiated at the computing device, and wherein the request includes the torrent identifier. In some embodiments, the request is initiated using a web browser on the computing device, and the intercepting is performed by the web browser determining that a Uniform Resource Identifier (URI) or Uniform Resource Locator (URL) to be processed for the request includes the torrent identifier. In some embodiments, the intercepting is performed by a firewall prior to the request reaching a destination computing device from which the torrent file can be downloaded.

In some embodiments, the identifying the torrent identifier includes the processor: scanning downloaded files for the torrent file, the scanning being performed based on file properties of the downloaded files; and upon locating the torrent file, parsing the torrent file for the torrent identifier. In some embodiments, the file properties used to perform the scanning include the Internet media (MIME) type of the downloaded files.

In some embodiments, the data indicating characteristics of the content associated with the torrent file includes information indicating whether the content is safe for download to the computing device. In some embodiments, the content associated with the torrent file includes a media file, and wherein the data indicating characteristics of the content includes information indicating the playback quality of the media file.

In some embodiments, the data indicating characteristics of the content associated with the torrent file is derived from a plurality of external torrent servers providing access to the torrent file. In some embodiments, the processor is further configured to: scan the external torrent servers to obtain respective rating information for the content associated with the torrent file; and generate a combined rating for the content associated with the torrent file, based on the respective rating information obtained from the external torrent servers. In some embodiments, the combined rating includes an average of the respective rating information obtained from the external torrent servers. In some embodiments, the processor is further configured to: determine an age of the rating information obtained from the external torrent servers; and wherein, the combined rating includes a weighted average of the respective rating information obtained from the external torrent servers, with older rating information being weighted more heavily in the weighted average.

In some embodiments, the torrent file includes an 'info' portion, and the torrent identifier includes an 'info_hash' of the 'info' portion. In some embodiments, the torrent identifier includes a hash of the torrent file.

In some embodiments, the processor is further configured to: identify a content identifier associated with the content to be downloaded to the computing device; use the content identifier to perform a search for additional data that indicates characteristics of the content associated with the torrent file, wherein the search locates the additional data indicating characteristics of the content associated with the torrent file; wherein, the control of whether to process the content at the computing device is performed in part based on the additional data. In some embodiments, the content identifier includes a hash of the content associated with the torrent file. In some embodiments, the content identifier is embedded within the torrent file, and the identifying the content identifier includes parsing the torrent file to locate the content identifier. In some embodiments, the content associated with the torrent file is downloaded to the computing device, and the identifying the content identifier includes deriving the content identifier from the downloaded content. In some embodiments, the additional data is derived from a plurality of external anti-virus servers configured to return information about the characteristics of the content based on the content identifier.

In some embodiments, the data indicating characteristics of the content, as determined from the torrent identifier, and the additional data indicating characteristics of the content, as determined from the content identifier, have overlapping information.

In some embodiments, the content associated with the torrent file includes a plurality of files, and wherein the data indicating characteristics of the content includes a plurality of rating information that are each associated with a corresponding file of the plurality of files.

In some embodiments, the controlling whether to process the content includes determining whether to download the content to the computing device. In some embodiments, the controlling whether to process the content includes determining whether to open the content after the content has been downloaded to the computing device.

In another broad aspect of the present disclosure, there is provided a server including a processor and a memory storing instructions for screening files during online file transfers at a computing device, wherein when the instructions are executed by the processor, the server: receives a torrent identifier for a torrent file from the computing device, the torrent file being associated with content to be processed at the computing device; determines, using the torrent identifier, data indicating characteristics of the content associated with the torrent file; and transmits the data indicating characteristics of the content associated with the torrent file to the computing device, wherein based on the transmitted data, the computing device controls whether to process the content associated with the torrent file at the computing device.

In another broad aspect of the present disclosure, there is provided a computer readable medium storing instructions for screening files during online file transfers at a computing device, wherein when the instructions are executed by a processor of the computing device, the instructions cause the processor to: identify a torrent identifier for a torrent file, the torrent file being associated with content to be processed at the computing device; use the torrent identifier to search a data store, the data store having data indicating characteristics of the content associated with the torrent file, wherein the search locates the data indicating characteristics of the content associated with the torrent file in the data store; and based on the located data, control whether to process the content associated with the torrent file at the computing device.

In another broad aspect of the present disclosure, there is provided a computer readable medium storing instructions for screening files during online file transfers at a computing device, wherein when the instructions are executed by a processor of a server, the instructions cause the server to: receive a torrent identifier for a torrent file from the computing device, the torrent file being associated with content to be processed at the computing device; determine, using the torrent identifier, data indicating characteristics of the content associated with the torrent file; and transmit the data indicating characteristics of the content associated with the torrent file to the computing device, wherein based on the transmitted data, the computing device controls whether to process the content associated with the torrent file at the computing device.

In another broad aspect of the present disclosure, there is provided a system for screening files during online file transfers, the system including: a computing device including a processor and a memory storing instructions for screening files during online file transfers; and a server including a data store, the data store having data indicating characteristics of the content associated with a torrent file; wherein when the instructions are executed by the processor of the computing device, the processor: identifies a torrent identifier for the torrent file, the torrent file being associated with content to be processed at the computing device; and transmits the torrent identifier to the server. The server: receives the torrent identifier from the computing device; determines, using the torrent identifier, data indicating characteristics of the content associated with the torrent file from the data store; and transmits the data indicating characteristics of the content associated with the torrent file to the computing device. The instructions stored at the computing device then further configure the processor of the computing device to: based on the data received from the server, control whether to process the content associated with the torrent file at the computing device.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, certain steps, signals, protocols, software, hardware, networking infrastructure, circuits, structures, techniques, well-known methods, procedures and components have not been described or shown in detail in order not to obscure the embodiments generally described herein.

Furthermore, this description is not to be considered as limiting the scope of the embodiments described herein in any way. It should be understood that the detailed description, while indicating specific embodiments, are given by way of illustration only, since various changes and modifications within the scope of the disclosure will become apparent to those skilled in the art from this detailed description.

The embodiments of the methods described herein may be implemented in hardware or software, or a combination of both. In some cases, embodiments may be implemented in one or more computer programs executing on one or more programmable computing devices (e.g., the various devices and servers discussed below) including at least one processor (e.g., a microprocessor), a data storage device (including in some cases volatile and non-volatile memory and/or data storage elements), at least one communications interface (e.g., a network interface card for wired or wireless network communications), at least one input device, and at least one output device. For example and without limitation, the programmable computing devices may be a personal computer, laptop, personal data assistant, cellular telephone, smartphone device, tablet computer, smartwatch, and/or wireless device. Additional examples of programmable computing devices are also discussed below. Program code is applied to input data to perform the functions described herein and generate output information. The output information is applied to one or more output devices.

Those of skill in the art will understand that the following description of illustrative embodiments of the disclosure does not limit the implementation of embodiments of the disclosure to any particular computer programming language. For example, in some embodiments, each program, module, or application may be implemented in a high level procedural or object oriented programming and/or scripting language to communicate with a computer system. However, the programs can be implemented in assembly or machine language, if desired. In any case, the language may be a compiled or interpreted language.

More specifically, embodiments of the disclosure may be implemented in any computer programming language provided that the operating system (O/S) provides the facilities that may support the present disclosure. For instance, an embodiment of the present disclosure may be implemented in part in the JAVA™ computer programming language (or other computer programming languages such as C or C++), but the web-related components of the present disclosure may more commonly be implemented using scripting languages typical for web development environments (e.g., JavaScript for client-side applications and PHP/Python/Perl for server-side applications). Those skilled in the art will also appreciate that any limitations presented by such an embodiment would be a result of a particular type of operating system or computer programming/scripting language and would not be a limitation of the present disclosure.

In some embodiments, the computing devices and methods as described herein may also be implemented as a transitory or non-transitory computer-readable storage medium configured with a computer program, wherein the storage medium so configured causes a computing device to operate in a specific and predefined manner to perform at least some of the functions as described herein. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled, non-compiled, bytecode, or other forms in which the instructions may be interpreted or translated.

Moreover, the subject system may be implemented as one or more software components stored on one or more computer servers that are accessible via one or more client machines in a client-server architecture. In such case, the system can be considered to be a hosted software offering or a software service in a software-as-a-service deployment.

Additional aspects and advantages of the present disclosure will be apparent in view of the description which follows.

Overview

Referring to FIG. 1, shown there generally as 100 is a block diagram for a system for screening files during online file transfers, in accordance with an embodiment of the present disclosure. The system 100 may include a computing device 110 that is attempting to process content associated with a torrent file, and a content screening server 130 for providing data indicating characteristics of such content to the computing device 110. The system 100 may also include one or more torrent servers 150 (only one is shown) and one or more swarm computing devices 120 (only one is shown), which partake in the peer-to-peer sharing of content associated with a torrent file with the computing device 110. Further, the system 100 may include one or more anti-virus servers 170 (only one is shown) that stores rating information for the content. Each of the computing device 110, swarm computing device 120, content screening server 130, torrent server 150, and anti-virus server 170 may be connected to a communications network such as the Internet 190 for facilitating communications.

As used herein, the term "content" relates to any electronic subject matter that may be the payload of a torrent file. In some embodiments, such content may include one or more electronic files or folders. As will be understood by persons skilled in the art, peer-to-peer protocols may be used to distribute files of many different types. Examples of types of files that may be distributed include academic papers or search results, open source software, or media files.

The computing devices 110 may be various programmable computing devices (examples of which were noted above) that are configured with a torrent client 114 that acts as a client device in a peer-to-peer protocol such as BitTorrent™. As noted above, client devices in the BitTorrent™ protocol may, using browser 112, first communicate with a torrent server 150 to identify a torrent file 155 that is associated with content desired to be processed at the computing device 110. Upon downloading the torrent file 155, the torrent client 114 may process it to identify peer swarm computing devices 120 (e.g., through the use of trackers) that make available portions of the content 118' residing thereon to be downloaded to the computing device 110. As illustrated, the swarm computing device 120 may itself be executing a torrent client 114', and the content portions 118' to be downloaded to the computing device 110 may be stored on the file system 126 of the swarm computing device 120.

At various points during this content acquisition process, the content filter 105 may intervene to control whether the computing device 110 processes the content associated with the torrent file 155 obtained from the torrent server 150. If content portions 118 are able to be downloaded, they would be stored on a file system 116 of computing device 110. Various ways in which the content filter 105 may control whether the computing device 110 processes the potentially-harmful content is discussed below in the context of step 265 of FIG. 2.

In various embodiments, the content filter 105 may be implemented as a software application (e.g., an anti-virus software application), a background process, a firewall, a browser plug-in, a plug-in component of a torrent client 114, or any combination thereof. If implemented as a firewall, there may be different forms taken (e.g., as a software firewall executing on the computing device 110, and/or as a software module executing on separate hardware off of the computing device 110 (not shown)). As discussed below with respect to step 205 of FIG. 2, the way in which the content filter 105 is implemented may affect how it determines if a torrent file is being attempted to be processed at the computing device 110.

The content screening server 130 may be a suitable computing server that is configured to make available a content filter Application Programming Interface (API) 132 to be accessible by the content filter 105 on the computing device 110. When accessed, the content filter API 132 may read data characteristics associated with the content from the content rating database 136 or the torrent rating database 138, and provide such data to the content filter 105 so that it may use it to control whether the content is processed at the computing device 110.

The content rating database 136 may contain content-specific rating information 137 for various content. In various embodiments, the combined content-specific rating information 137 may be indexed by content identifiers such as a hash of the content.

The torrent rating database 138 may contain combined torrent-related rating information 139 for torrent files 155. In various embodiments, the combined torrent-related rating information 139 may be indexed by a torrent identifier such as a hash of the torrent. The combined torrent-related rating information 139 may not only refer to the quality or safety of the content associated with the torrent file 155, but it may also contain data about characteristics of the content that is specific to the file type of the content. For example, where the content associated with the torrent file 155 is a media file, the combined torrent-related rating information 139 may indicate the playback quality of the media file. In further embodiments, the combined torrent-related rating information 139 may include information related to the download process for the content such as the number of seeds making available complete copies of the content or the "availability" of the content (e.g., the number of distributed copies of the content potentially spread amongst multiple peers).

To populate and maintain the torrent rating database 138 and the content rating database 136, the content screening server 130 may be provided with a rating application 134 that communicates with torrent server 150 and anti-virus server 170 to obtain rating information. For example, the rating application 134 may communicate with a torrent web server 150 that makes normally also makes torrent files 155 available to torrent clients 114. As discussed further below, the rating application 134 may make requests of one or more torrent servers 150, download such information for storage in torrent rating database 138, and generate combined torrent-related rating information 139 for returning to the content filter 105 on computing device 110 when requested. Similarly, the rating application 134 may also make requests of one or more anti-virus servers 170 to obtain content-specific rating information, download such information onto content rating database 136, and generate combined content-specific rating information 137 for returning to content filter 105 on computing device 110 when requested.

While the content filter API 132 and the rating application 134 are illustrated and discussed herein as separate modules, it will be appreciated that in alternate embodiments, the functionality provided by the different modules may be combined together into a single module or further separated into more than the described two modules, depending on the nature of the implementation. Similarly, although the content ratings database 136 and torrent rating database 138 in the content screening server 130 are described and illustrated as being stored in distinct and separate databases, in alternate embodiments, the different types of data may be stored together.

In various example embodiments, the content screening server 130 may a dedicated server computer, mainframe, computer cluster, cloud-computing service or like computing resource. In various embodiments, the components of the content screening server 130 may be implemented using a web technology stack such as LAMP (e.g., use of the Linux operating system, Apache web server, MySQL relational database management system, and the PHP programming language), or Microsoft™ technologies such as a the .NET framework, SQL Server™ database, and Internet Information Services (IIS™) web server. Various types of database technologies (e.g., MySQL, Oracle™, or IBM DB2™) may be used to provide the database(s) described herein. As will be understood by a person skilled in the art, variations in the technologies used to implement the described inventions may be possible.

Torrent server 150 may be a third-party torrent tracking server providing a website accessible by the browser 112 of computing device 110. Examples of such third-party torrent tracking websites offered by torrent servers 150 include KickassTorrents available at the Uniform Resource Locator (URL)<http://kat.cr>, or Torrentz available at <www.torrentz.eu>. An example torrent server 150 may have a torrent server application 152 (e.g., a web server application such as Apache™) from which a browser 112 on computing device 110 may download a torrent file 155 or from which a rating application 134 on content screening server 130 may obtain rating information for a torrent file 155. The torrent server 150 may also include a torrents database 154 for storing torrent files 155, as well as a ratings database 156 for storing torrent-related rating information 157, as has been accumulated by that particular torrent server 150.

Anti-virus server 170 may be a third-party anti-virus server or cloud-computing service that provides an anti-virus API 172 for identifying malicious files and content. The anti-virus API 172 may have programming interfaces that allow searching by content identifiers such as hashes of the content, and may be accessed by the rating application 134 when the content screening server 130 attempts to generate a combined content-specific rating information 137. The anti-virus server 170 may have a malicious file and rating database 174 storing content-specific information 175 related to malicious files and content. This database 174 is accessible by the anti-virus API 172. Examples of third-party anti-virus servers 170 include those that may be made accessible by Kaspersky™.

Internet 190 is illustrated in FIG. 1 as an example of a communications network that may facilitate communications amongst the devices and servers shown. However, it will be understood that other communications networks may also be possible. For example, the communication of messages described in the current disclosure may be performed (either wholly or partially) through proprietary or private networks, or cellular networks.

As illustrated in FIG. 1, the software functionality of the content screening server 130 is shown as being provided on a server that is separate from the computing device 110. However, in alternate embodiments (not shown in FIG. 1), one or more of the content API 132, rating app 134, content database 136, or torrent rating database 138 may be provided on the computing device 110 itself. In such embodiments, the computing device 110 may be considered to be performing the various steps described herein as being performed by the contents screening server 130 (or its various respective modules), and the communications described as taking place between the computing device 110 and the content screening server 130 may be considered to be internal communications amongst modules within the computing device 110. In some such embodiments, the computing device 110 may still receive data from external servers to update the content rating database 136 and/or the torrent rating database 138. For example, if the functionality of content screening server 130 is included into an anti-virus software application executing on computing device 110, such updates may accompany anti-virus signature updates provided to the anti-virus software application.

Screening Files During Online File Transfer

Figure 2:
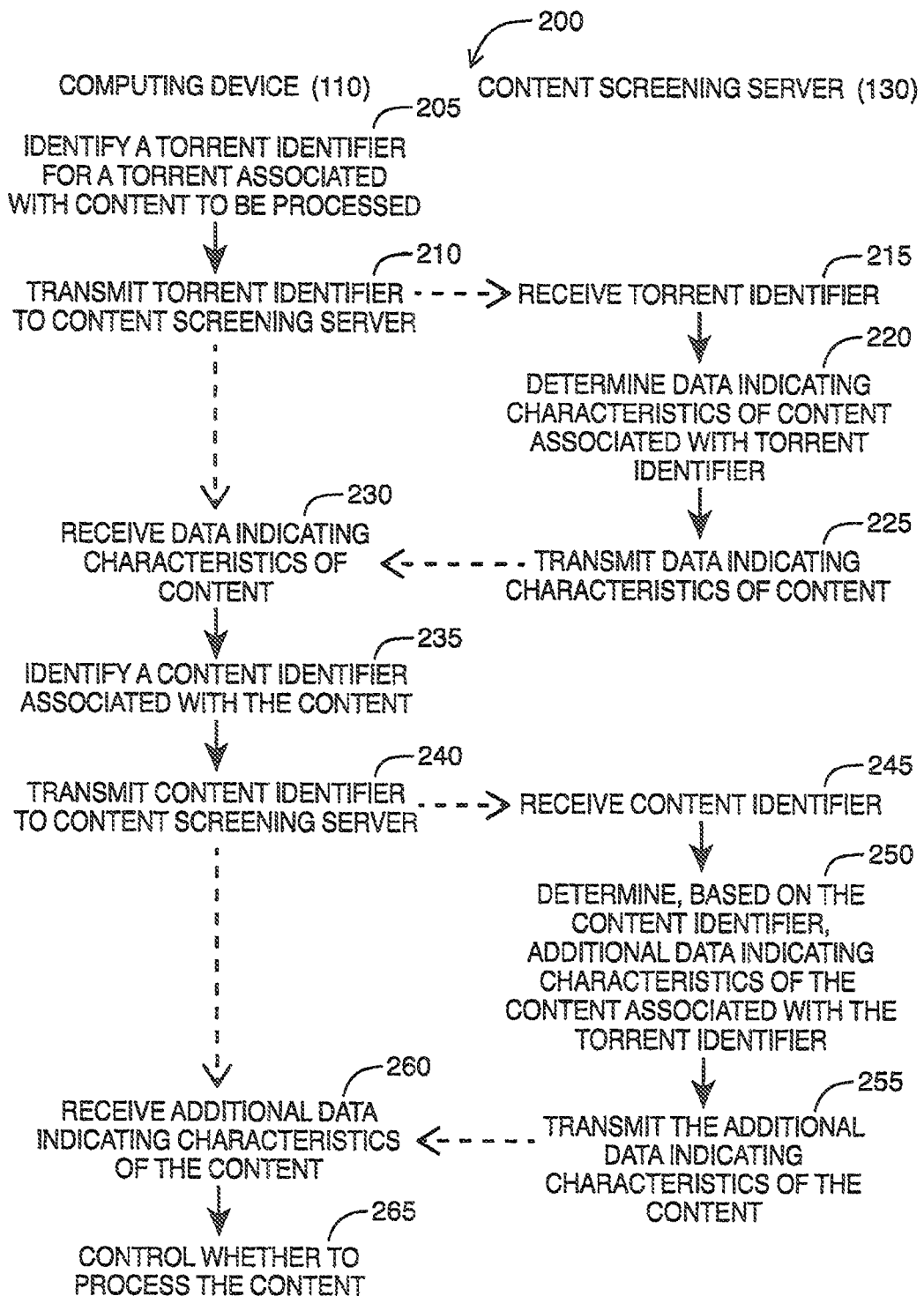
FIG. 2 is a flowchart diagram illustrating steps performed by a computing device and a content screening server when screening files during online file transfers, in accordance with at least one embodiment of the present invention.

Referring to FIG. 2, shown there generally as 200 is a method of screening files during online file transfers at a computing device. In describing the steps of FIG. 2, reference will simultaneously be made to the various components shown in FIG. 1. As illustrated, FIG. 2 shows the interactions between the computing device 110 and the content screening server 130. In some embodiments, the steps described as being performed by the computing device 110 may be performed by a processor provided on the computing device 110, executing the content filter 105. Similarly, the steps described as being performed by the content screening server 130 may be performed by a processor provided on the content screening server 130, executing the content filter API 132.

At step 205, the computing device 110 may identify a torrent identifier for a torrent file that is associated with content to be processed at the computing device 110. In some embodiments, this may involve the computing device 110 detecting that a torrent identifier is being provided on a webpage that a user of the computing device 110 is attempting to access (e.g., being provided via a hyperlink that is accessible available on the webpage). This detection may be performed prior to such torrent identifier being made available for access at the computing device 110 (e.g., to block the hyperlink from even appearing within the browser application 112). Additionally or alternatively, the detection may be performed after such a torrent identifier is made available for access at the computing device 110, so as to provide more flexibility and allow the user of the computing device 110 to attempt to access the torrent file.

As noted above, a user of the computing device 110 may attempt to access the torrent file by accessing the server application 152 at a torrent server 150. In doing so, in various embodiments, step 205 may involve the content filter 105 identifying the torrent identifier by intercepting a request to download the torrent file initiated at the computing device 110. This may involve the content filter 105 acting to filter Hypertext Transfer Protocol (HTTP) requests initiated by the browser 112 at the computing device 110, and then scanning for hash representations of torrent files (e.g., when a magnet link is used to access a torrent file) within the URI or URL. If a hash of a torrent file is identified within the URI or URL, then such hash can be considered the torrent identifier.

This interception a request function of the content filter 105 can be performed in different ways depending on how the content filter 105 is implemented. For example, in one embodiment, the content filter 105 may be implemented as a browser plug-in that intercepts HTTP requests made by the web browser 112. Additionally or alternatively, the content filter 105 may be implemented as a software firewall so that the request is intercepted prior to it reaching a destination computing device (e.g., the torrent server 150) from which the torrent file 155 can be downloaded.

Instead of intercepting a request to download the torrent file to identify the torrent identifier, the content filter 105 may be configured to intervene after a torrent file 155 has already been downloaded. For example, in one embodiment, the content filter 105 may be implemented as a plug-in to a torrent client 114, and the content filter 105 may intercept a request to open a torrent file to begin downloading the content associated with the torrent file. In another embodiment, the content filter 105 may be implemented as a software application that scans files downloaded by the browser 112 for torrent files. Upon locating a torrent file, the content filter 105 may identify the torrent identifier from the torrent file 155.

In the latter example of scanning for downloaded files, such scanning may be performed in a number of ways. For example, the scanning may be performed based on file extensions (e.g., locating files with a .torrent extension), file properties (e.g., the Internet media or MIME type) of the downloaded files, file names (e.g., by comparing the file name of a downloaded file against file names already known to be associated with torrent files), the URLs or URIs from which the files were downloaded (e.g., by comparing the URI or URL of a downloaded file against URIs or URLs that are known to be associated with providing torrent files), a hash of the downloaded file (e.g., by creating a hash of the downloaded file and comparing it against hash values that are known to be hashes of torrent files), or any combination of the foregoing.

To identify the torrent identifier from a downloaded torrent file 155, the content filter 105 may generate a hash of the torrent file 155. Known hash algorithms (e.g., MD5, SHA-1) may be used to generate such a 'global' hash. Alternatively, the content filter 105 may use the hash of the 'info' portion of the torrent file 155 as the torrent identifier. As will be understood by a person skilled in the art, the hash of the 'info' portion of a torrent file may be called the 'info_hash' of the torrent file (and the 'info' portion of the torrent file may itself be made up of hashes of the individual 'pieces' of the payload for the torrent file 155). The content screening server 130 may be configured to receive either the hash of the entire torrent file (e.g., a 'global' hash) or the info_hash as the torrent identifier.

Referring again to FIG. 2, at step 210, the computing device 110 may transmit the torrent identifier to the content screening server 130. The torrent identifier may be received at the content screening server 130 at step 215.

At step 220, the content screening server 130 may determine data indicating characteristics of the content (that is the payload of the torrent file) attempted to be downloaded at the computing device 110. As explained above, the content screening server 130 may store data indicating characteristics of the content associated with the torrent file. For example, using the torrent identifier received at step 215, the content screening server 130 may read data from the torrent rating database 138 to locate corresponding combined torrent-related rating information 139 relevant to that torrent identifier. As described in greater detail below with respect to FIG. 3, the combined torrent-related rating information 139 may be read and combined from different torrent-related rating information 157 stored at multiple torrent servers 150.

As noted above, the combined torrent-related rating information 139 may include information indicating whether the content is safe for download to the computing device. However, in some embodiments, step 220 may also retrieve data that is a result of analysis having been performed on the torrent file identified by the torrent identifier, such data having been included in the combined torrent-related rating information 139.

The analysis of the torrent file to generate rating information may take different forms. For example, in the case where the content is supposed to be a media file, the file size of the content indicated in the torrent file may provide an indication of whether the actual payload content associated with the torrent is in fact the expected media file. E.g., for a video file, an overly small file size may suggest that the content is not in fact a video file and instead may be a malicious of harmful file. Similarly, an audio file with an overly large file size may also be suspect for the same reason.

Also, the information related to the download process for the content may be taken into account during this analysis. For example, the number of leechers/seeders and the number of downloads may provide an indication as to whether the content is legitimately representative of what it is identified as. That is, a smaller number of leechers/seeders or downloads may suggest that the true payload content associated with the torrent is not actually the same as what the torrent represents it as, and that such payload content may potentially be harmful or malicious.

As noted above, in some embodiments, the content associated with a torrent file may include a number of files or folders (and potentially a nested folder structure with files within the folders). In some embodiments, the combined torrent-related rating information 139 may include rating information for each constituent file/folder of the content. Using such rating information, the content filter 105 may be able to identify particular files of the content as being unsafe, while indicating that certain other files are safe.

At step 225, the content screening server 130 may return the combined torrent-related rating information 139 read from the torrent rating database 138 as the data indicating characteristics of the content associated with the torrent identifier. At step 230, the computing device 110 receives the data indicating characteristics of the content associated with the torrent identifier from the content screening server 130.

Referring still to FIG. 2, the method may, in some embodiments, proceed directly to step 265 after step 230 is performed. Thus, step 265 will now be discussed, prior to the discussion of optional steps 235 to 260.

Step 265 involves the computing device 110 controlling whether it processes the content based on the data received at step 230. In some embodiments, such controlling may involve determining whether to download the content to the computing device 110. For example, in such embodiments, the controlling may result in a warning window that is displayed on the computing device 110 warning the user that the torrent file's target content they are attempting to download may be malicious. Such warning may provide an early alert to the user about a potential security risk associated with the content associated with the torrent file they are about to download, so as to enable them to confirm they want to proceed before the content is actually downloaded. This saves the user of the computing device 110 from damage resulting from downloading and executing malicious files. It may also save them from wasting computing resources (e.g., bandwidth, processing power, hard drive storage space, battery usage if on a mobile device, and/or usage towards Cellular Network/Internet Service Provider (ISP) data caps) on downloading files that are ultimately not going to be used.

As such, intercepting a request to download the content associated with the torrent file in this manner may be desirable over the operation of regular anti-virus software, which does not traditionally operate on torrent files. In the traditional environment, a torrent client 114 may immediately start downloading the content associated with the torrent file without the benefit of the check provided by the embodiments described herein; the computing device may only be protected when the anti-virus software scans and correctly identifies the files as being malicious or harmful once the content has been downloaded.

Notwithstanding, in additional or alternative embodiments, the controlling performed at step 265 may also involve the computing device 110 determining whether to open the content after the content has been downloaded to the computing device 110. For example, this type of controlling may be performed if the content filter 105 is implemented as anti-virus software that intercepts actions related to opening of unknown files. In such embodiments, the torrent-based data indicating characteristics of the content received at step 230 may serve as an additional source of information not used by traditional anti-virus software for determining whether downloaded content is malicious.

In a further example embodiment of controlling whether to process the content after the content has been downloaded, a content filter 105 may be configured to operate with multiple modes of operation that range from highly-restrictive to less-restrictive. In such an environment, if the content filter 105 is set to a mode where it is less restrictive, it may be configured to not intervene prior to the downloading of the content, but only after the content has been downloaded. Although allowing the content to be downloaded may potentially be less secure, this mode may offer more flexibility for users who are familiar with the torrent files they are accessing and know them to be safe.

Figure 5:
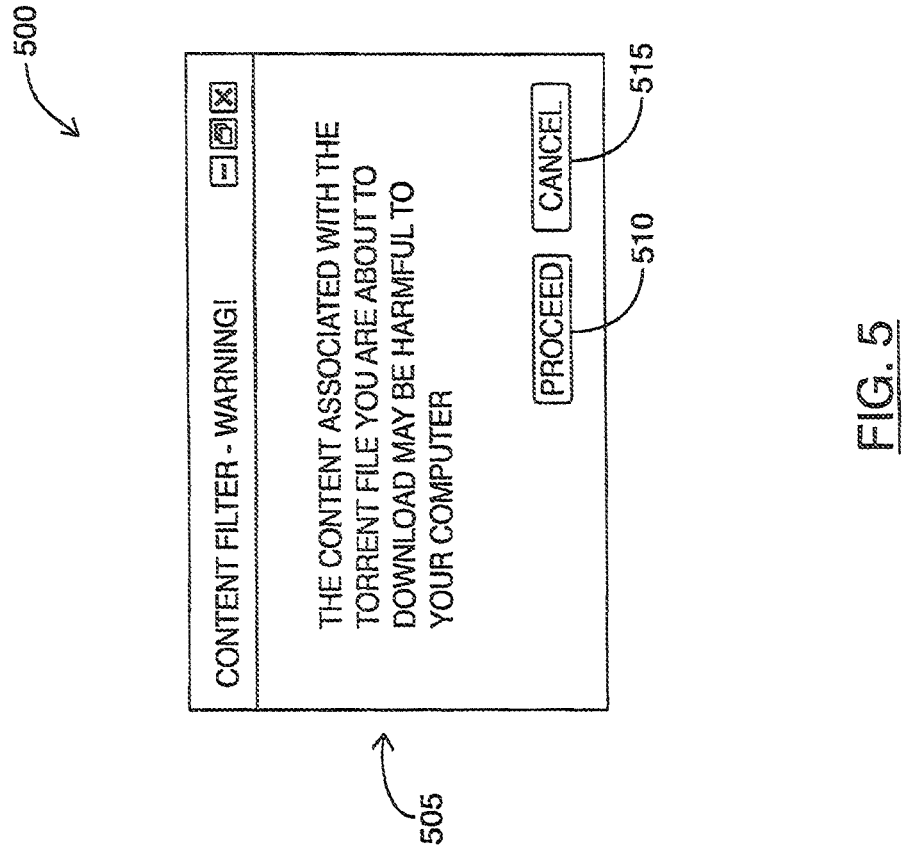
FIG. 5 is an example user interface showing a warning screen at a computing device for when a potential harmful file is detected, in accordance with at least one embodiment of the present invention.

Referring simultaneously to FIG. 5, shown there generally as 500 is an example user interface of a warning screen at a computing device 110 for when a potential harmful file is detected, in accordance with at least one embodiment of the present invention. As shown, the warning message 505 is for the scenario where the content filter 150 controls whether the content is to be processed before the content is to be downloaded to the computing device 110. The example user interface has a 'Proceed' button 510 and a 'Cancel' button 515 to allow a user to select whether select whether they want to proceed or not in view of the detected potential harmfulness of the content associated with torrent file they are accessing. As will be understood by a person skilled in the art, appropriate warning messages may be displayed in the case where the control of whether the content is to be processed is performed after the content has been downloaded to the computing device 110. Similarly, variations in the presentation of the user interface may be possible.

Referring back to FIG. 2, optional steps 235 to 260 will now be discussed. Steps 235-260 relate to scenarios where the computing device 110 receives additional data indicating characteristics of the content associated with the torrent file based on a content identifier. This additional data provides the computing device 110 with an additional basis for controlling whether or not the computing device 110 should process the content.

At step 235, the computing device 110 may identify a content identifier associated with the content that is the target payload of the torrent file. As noted above, in some embodiments, the content filter 105 may permit downloading of the content associated with the torrent file. In such scenarios, the computing device may derive the content identifier from the downloaded content (e.g., by generating a hash of the content and using it as the content identifier). Additionally or alternatively, the content identifier may be embedded within the torrent file, and step 235 may involve parsing the torrent file to locate the content identifier.

At step 240, the computing device 110 may transmit the content identifier to the content screening server 130. The content identifier may be received at the content screening server 130 at step 245.

At step 250, the content screening server 130 may determine additional data indicating characteristics of the content associated with the torrent file. As explained above, the content screening server 130 may store data indicating characteristics of the content associated with the torrent file. For example, using the content identifier received at step 245, the content screening server 130 may read data from the content rating database 136 to locate corresponding combined content-specific rating information 137 relevant to that content identifier. As described in greater detail below with respect to FIG. 4, the combined content-specific rating information 137 may be generated by combining different content-specific rating information 175 stored at multiple anti-virus servers 170.

At step 255, the content screening server 130 may return the combined content-specific rating information 137 read from the content rating database 136 as the additional data indicating characteristics of the content associated with the torrent identifier. At step 260, the computing device 110 may receive the additional data indicating characteristics of the content associated with the torrent file from the content screening server 130.

If steps 235-260 are performed, when the computing devices 110 proceeds to control whether to process the content at the computing device at step 265, it may do so based in part on the additional data received at step 260. Although the torrent-identifier based data and the content-identifier based data may have differing information, in some embodiments, they may also have overlapping information. For example, both sets of data may relate to the safety of the content.

As such, the additional data may be used by the computing device 110 as a way to confirm the torrent-identifier based data indicating characteristics of the content received at step 230 by the computing device 110. For example, if the torrent-identifier based data received at step 230 indicates the content is potentially harmful, and the content-identifier based additional data received at step 260 also indicates that the content is potentially harmful; the additional data may act as a way to reduce the likelihood of intervention on the basis of a false positive. In another example, if the torrent-identifier based data received at step 230 indicates that the content is safe, but the content-identifier based additional data received at step 260 indicates that the content is harmful, then the content filter 105 may control whether the content is processed on the basis of the additional data received at step 260. In this manner, the additional data may act as a secondary layer of protection to catch potentially harmful content that is not caught by the torrent-identifier based data received at step 230.

In various embodiments, in the case where the torrent-identifier based data received at step 230 and the content-identifier data received at step 260 suggest conflicting conclusions, the content filter 105 may be configured to prioritize one set of data over another. In further embodiments, the content filter 105 may be configured to communicate the nature of the conflicting conclusions back to the content screening filter 130 so that the content filter API 132 executing thereon may align the combined content-specific rating information 137 with the combined torrent-related rating information 139 for future recipients of such data.

Generating Combined Torrent-Related Rating Information

Figure 3:
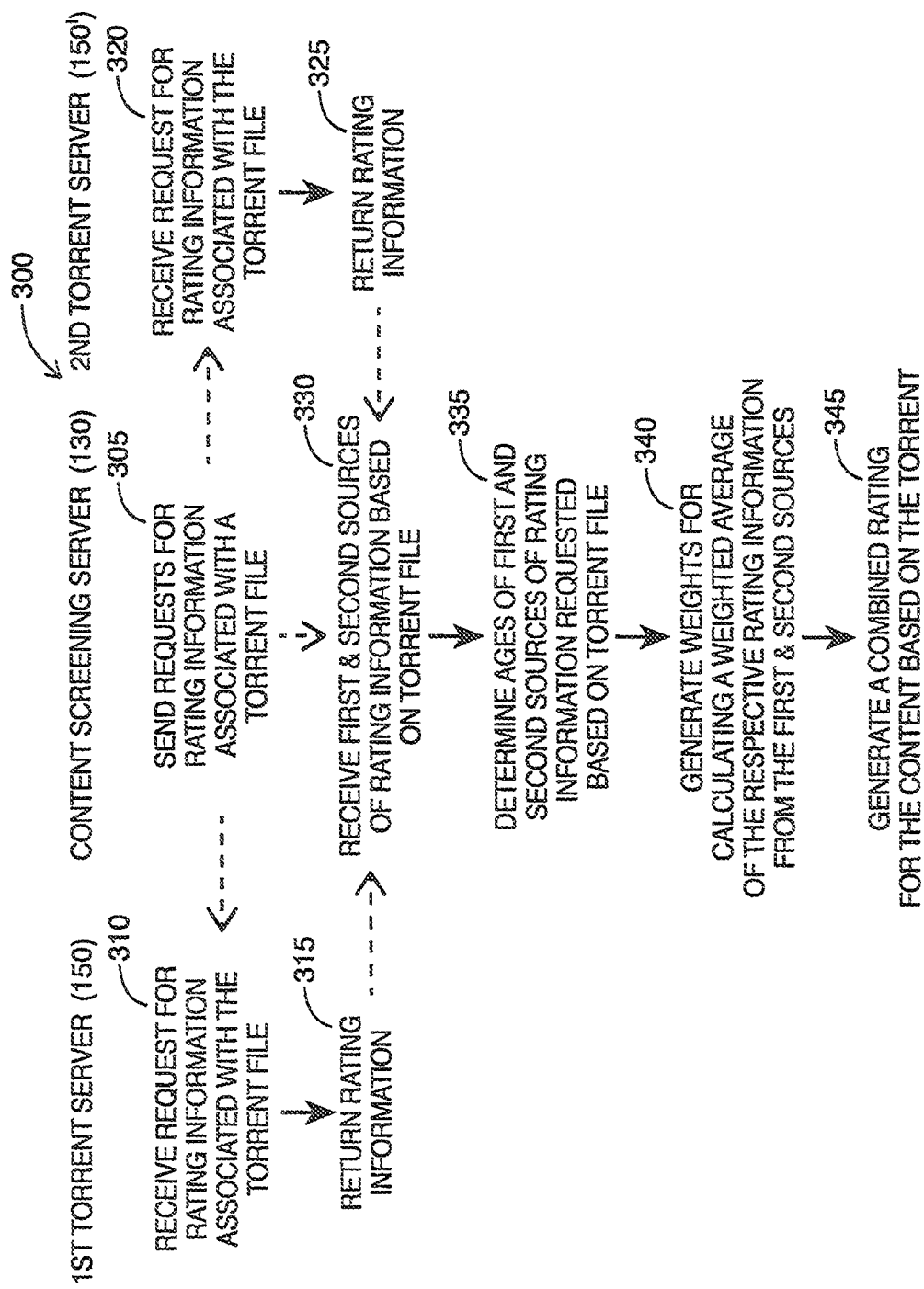
FIG. 3 is a flowchart diagram illustrating steps performed by a content screening server and torrent servers when the content screening server retrieves rating information for content associated with a torrent file from the torrent servers, in accordance with at least one embodiment of the present invention.

Referring to FIG. 3, shown there generally as 300 is a flowchart diagram illustrating steps performed by a content screening server 130 and two torrent servers 150, 150' when the content screening server 130 retrieves torrent-related rating information for content associated with a torrent file, in accordance with at least one embodiment of the present invention. In describing the steps of FIG. 3, reference will simultaneously be made to the various components shown in FIG. 1. As illustrated, FIG. 3 shows the interactions between the content screening server 130 and two torrent servers 150, 150'. In some embodiments, the steps described as being performed by the content screening server 130 may be performed by a processor provided on the content screening server 130, executing the rating application 134.

At 305, the content screening server 130 may scan the first and second torrent servers 150, 150' for rating information of content associated with a torrent file. This may be performed by sending requests for such rating information to the first torrent server 150 and the second torrent server 150'. The request for rating information may include a torrent identifier which, as noted above in the context of step 205 of FIG. 2, may be generated by applying a hash algorithm to the torrent file or taking the info_hash portion of the torrent file.

As noted above, torrent servers 150 may generally be providing access to torrent files 155 to computing devices that wish to use the BitTorrent™ protocol to download content. Although illustrated in FIG. 1 as being hosted on the torrent server 150, the phrase "providing access to the torrent file 155" as used herein includes situations where torrent servers 150 merely provide a link to a third-party hosting the torrent file 155.

At steps 310 and 315, the first torrent server 150 may receive the request for rating information from the content screening server 130 and return the torrent-related rating information 157 stored in its ratings database 156.

At steps 320 and 325, the second torrent server 150' may receive the request for rating information from the content screening server 130 and return the torrent-related rating information 157 stored in its ratings database 156.

Instead of or in addition to the content screening server 130 sending explicit requests to torrent servers 150 for torrent-identifier based rating information 157, in various embodiments, such rating information may be obtained by the rating application 134 on the content screening server 130 performing web crawling of web pages made available by a torrent server application 152 executing on torrent server 150.

At step 330, the content screening server 130 receives, from the first torrent server 150 and the second torrent server 150' respectively, first and second sources of rating information based on the torrent file.

From step 330, the content screening server 130 may proceed directly to step 345 without performing optional steps 335 and 340. At step 345, the content screening server 130 generates a combined torrent-based rating for the content, as generated from on the respective rating information received from the external first and second torrent servers 150, 150' at step 330. The manner in which the rating application 134 at the content screening server 130 generates the combined rating may differ. For example, where the rating information constitutes a numerical value such as a percentage or a number of stars, the combined rating may be an average of the respective rating information obtained from the external torrent servers 150, 150'. Upon generation of the combined rating, the rating application 134 at the content screening server 130 may store such information into the torrent rating database 138 as the combined torrent-related rating information 139, so that such information is available to be returned to a content filter 105 of a computing device 110 upon request.

In other embodiments, optional steps 335 and 340 may be performed prior to generating the combined rating at step 345. Step 335 involves determining the ages of the rating information obtained from the external first and second torrent servers 150, 150'. This may be determined, for example, from the timestamps of the respective rating information received at step 330.

Step 340 involves generating weights for calculating a weighted average of the respective rating information from the first and second torrent servers 150, 150'. These weights may be based on, for example, the ages determined at steps 335 in a manner where older rating information is treated as being more authoritative and accorded a higher weight.

Generating Combined Content-Specific Rating Information

Figure 4:
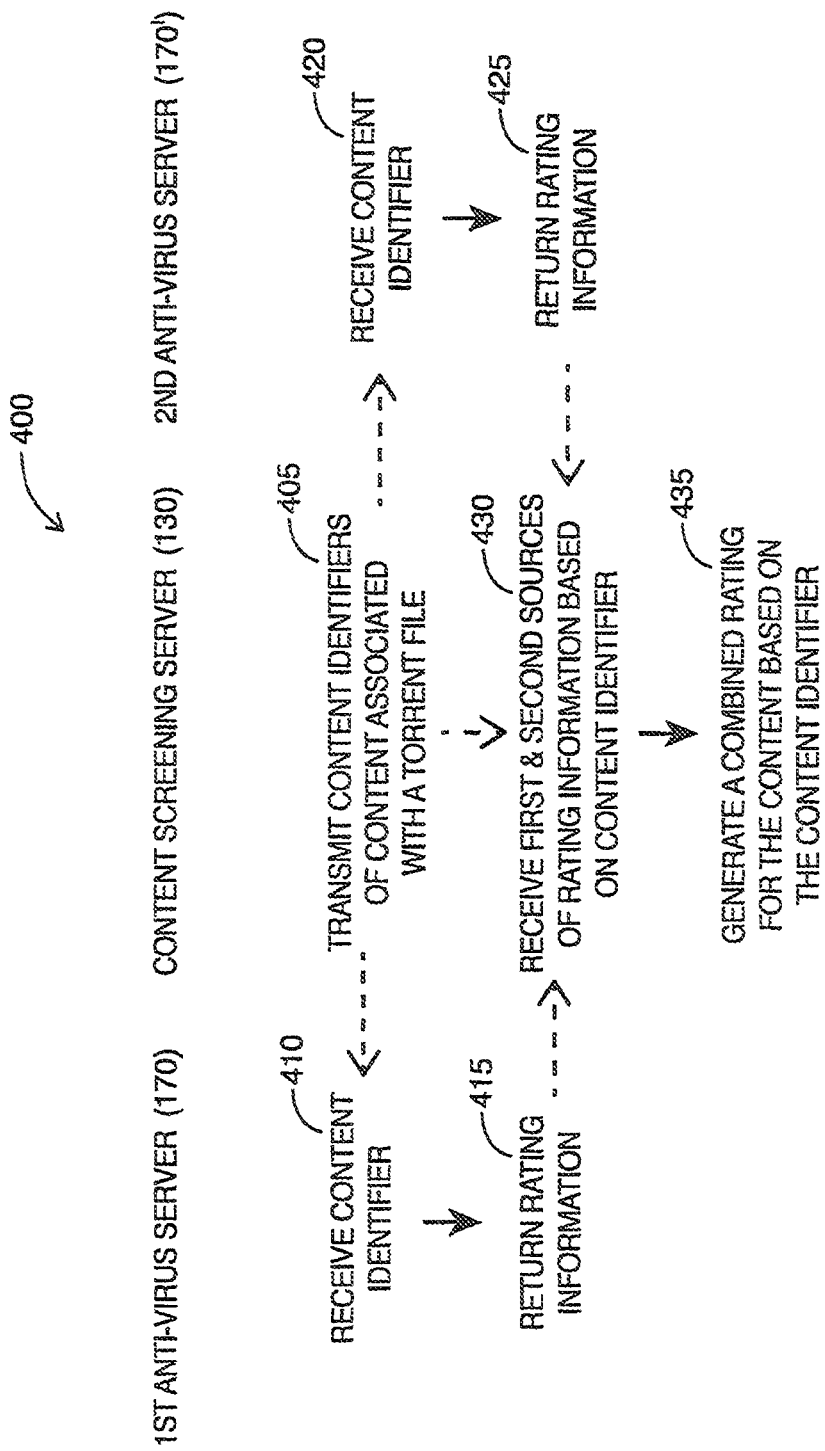
FIG. 4 is a flowchart diagram illustrating steps performed by a content screening server and anti-virus servers when the content screening server retrieves rating information for content associated with a torrent file from anti-virus servers, in accordance with at least one embodiment of the present invention.

Referring to FIG. 4, shown there generally as 400 is a flowchart diagram illustrating steps performed by a content screening server 130 and two anti-virus servers 170, 170' when the content screening server 130 retrieves rating information for content associated with a torrent file, in accordance with at least one embodiment of the present invention. In describing the steps of FIG. 4, reference will simultaneously be made to the various components shown in FIG. 1. As illustrated, FIG. 4 shows the interactions between the content screening server 130 and two anti-virus servers 170, 170'. In some embodiments, the steps described as being performed by the content screening server 130 may be performed by a processor provided on the content screening server 130, executing the rating application 134.

At 405, the content screening server 130 may scan the external first and second anti-virus servers 170, 170' for rating information of content associated with a torrent file. This may be performed by sending content identifiers of the content to the first anti-virus server 170 and the second anti-virus server 170'. In some embodiments, the content identifiers may be identified by the rating application 134 from a hash of the content (e.g., a hash generated using the MD5 hash algorithm) found in a torrent file.

At steps 410 and 415, the first anti-virus server 170 may receive the content identifier from the content screening server 130 and return the rating information 175 stored in its malicious file and ratings database 174.

At steps 420 and 425, the second anti-virus server 170' may receive the content identifier from the content screening server 130 and return the rating information 175 stored in its malicious file and ratings database 174.

Similar to the discussion above with respect to FIG. 3, instead of or in addition to the content screening server 130 sending explicit requests for content-identifier based rating information, such rating information may be obtained by the rating application 134 on the content screening server 130 performing web crawling of web pages made available by an anti-virus server 170.

At 430, the content screening server 130 may receive, from the first anti-virus server 170 and the second anti-virus server 170' respectively, first and second sources of rating information based on the content identifier.

At step 435, the content screening server 130 may generate a combined rating for the content, based on the respective rating information received from the external first and second anti-virus servers 170, 170' at step 430. The manner in which the rating application 134 at the content screening server 130 generates the combined content-identifier based rating may differ. For example, where the rating information constitutes a numerical value such as a percentage or a number of stars, the combined rating may be an average of the respective rating information obtained from the external anti-virus servers 170, 170'. Upon generation of the combined rating, the rating application 134 at the content screening server 130 may store such information into the content rating database 136 as the combined content-specific rating information 137, so that such information is available to be returned to a content filter 105 of a computing device 110 upon request.

All publications and patent applications mentioned in this specification are herein incorporated by reference to the same extent as if each individual publication or patent application was specifically and individually incorporated by reference.

While the foregoing disclosure has been described in some detail for purposes of clarity and understanding, such disclosure is provided by way of example only. It will be appreciated by one skilled in the art, from a reading of the disclosure that various changes in form and detail of these exemplary embodiments can be made without departing from the true scope of the disclosure, which is limited only by the appended claims. For example, it should be understood that acts and the order of the acts performed in the processing described herein may be altered, modified and/or augmented (whether or not such steps are described in the claims, figures or otherwise in any sequential numbered or lettered manner) yet still achieve the desired outcome. While processes or blocks are presented in a given order, alternative examples may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, or may be performed at different times.

In the various user interfaces illustrated in the figures, it will be understood that the illustrated user interface text and controls are provided as examples only and are not meant to be limiting with regards to their appearance. Other suitable ways of arranging and modifying the appearance of user interface elements may be possible.

Those skilled in the relevant art will appreciate that aspects of the system can be practised with other communications, data processing, or computer system configurations, including: Internet appliances, cloud computing, multi-processor systems, microprocessor-based or programmable devices, network PCs, mini-computers, mainframe computers, and the like.

Software and other modules may be accessible via local memory, via a network, via a browser or other application in an Application Service Provider (ASP) context, or via other means suitable for the purposes described herein. Examples of the technology can also be practised in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures (e.g., containers) described herein may include computer files, variables, programming arrays, programming structures, or any electronic information storage schemes or methods, or any combinations thereof, suitable for the purposes described herein.

Where a component (e.g. a model, processor, scheduler, display, data store, software module, assembly, device, circuit, etc.) is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

What is claimed is:

1. A method of screening content associated with a torrent file for downloading at a computing device, the method comprising:
   identifying a torrent identifier of the torrent file, the torrent file being associated with content to be processed at the computing device;
   using the torrent identifier to search a data store for torrent rating data associated with the torrent file, the torrent rating data indicating characteristics of the content associated with the torrent file, the torrent rating data being searchable using the torrent identifier; and
   based on the located torrent rating data, controlling whether to process the content associated with the torrent file at the computing device;
   wherein the torrent rating data is derived by a content screening server aggregating server-specific rating information of the torrent file that has accumulated separately at each of a plurality of external torrent servers that has provided access to the torrent file.

2. The method of claim 1, wherein the data store is provided at a content screening server and in order to search the data store using the torrent identifier, the method further comprises:
   transmitting the torrent identifier to the content screening server, wherein the content screening server is configured to search the torrent rating data for transmission to the computing device; and
   receiving, by the computing device, the torrent rating data.

3. The method of claim 1, wherein the data store is provided at the computing device.

4. The method of claim 1, wherein the torrent identifier is detected on a webpage received from a web server.

5. The method of claim 1, wherein the step of identifying the torrent identifier comprises intercepting a request to download the torrent file initiated at the computing device, and wherein the request comprises the torrent identifier.

6. The method of claim 5, wherein the request is initiated using a web browser on the computing device, and the intercepting is performed by the web browser determining that a Uniform Resource Identifier (URI) or Uniform Resource Locator (URL) to be processed for the request comprises the torrent identifier.

7. The method of claim 5, wherein the intercepting is performed by a firewall prior to the request reaching a destination computing device from which the torrent file can be downloaded.

8. The method of claim 1, wherein the step of identifying the torrent identifier comprises:
   scanning downloaded files for the torrent file, the scanning being performed based on file properties of the downloaded files; and
   upon locating the torrent file, parsing the torrent file for the torrent identifier.

9. The method of claim 8, wherein the file properties used to perform the scanning comprise the Internet media (MIME) type of the downloaded files.

10. The method of claim 1, wherein the torrent rating data indicating characteristics of the content associated with the torrent file comprises information indicating whether the content is safe for download to the computing device.

11. The method of claim 1, wherein the content associated with the torrent file comprises a media file, and wherein the torrent rating data indicating characteristics of the content comprises information indicating the playback quality of the media file.

12. The method of claim 1, wherein the aggregating of server-specific rating information comprises:
scanning each of the external torrent servers to obtain respective server-specific rating information of the torrent file; and
generating the torrent rating data based on combining the respective server-specific rating information obtained from each of the external torrent servers.

13. The method of claim 12, wherein the torrent rating data comprises an average of the respective server-specific rating information obtained from the external torrent servers.

14. The method of claim 12, further comprising:
determining an age of the server-specific rating information obtained from the external torrent servers; and
wherein the torrent rating data comprises a weighted average of the respective server-specific rating information obtained from the external torrent servers, with older rating information being weighted more heavily in the weighted average.

15. The method of claim 1, wherein the torrent file comprises an 'info' portion, and the torrent identifier comprises an 'info_hash' of the 'info' portion.

16. The method of claim 1, wherein the torrent identifier comprises a hash of the torrent file.

17. The method of claim 1, further comprising:
identifying a content identifier associated with the content to be downloaded to the computing device;
using the content identifier to perform a search for additional data that indicates characteristics of the content associated with the torrent file, wherein the search locates the additional data indicating characteristics of the content associated with the torrent file;
wherein the step of controlling whether to process the content at the computing device is performed in part based on the additional data.

18. The method of claim 17, wherein the content identifier comprises a hash of the content associated with the torrent file.

19. The method of claim 17, wherein the content identifier is embedded within the torrent file, and the step of identifying the content identifier comprises parsing the torrent file to locate the content identifier.

20. The method of claim 17, wherein the content associated with the torrent file is downloaded to the computing device, and the step of identifying the content identifier comprises deriving the content identifier from the downloaded content.

21. The method of claim 17, wherein the additional data is derived from a plurality of external anti-virus servers that are configured to return information about the characteristics of the content based on the content identifier.

22. The method of claim 17, wherein the torrent rating data indicating characteristics of the content, as determined from the torrent identifier, and the additional data indicating characteristics of the content, as determined from the content identifier, have overlapping information.

23. The method of claim 1, wherein the content associated with the torrent file comprises a plurality of files, and wherein the torrent rating data indicating characteristics of the content comprises a plurality of rating information that are each associated with a corresponding file of the plurality of files.

24. The method of claim 1, wherein the step of controlling whether to process the content comprises determining whether to download the content to the computing device.

25. The method of claim 1, wherein the step of controlling whether to process the content comprises determining whether to open the content after the content has been downloaded to the computing device.

26. A method of screening content associated with a torrent file with a content screening server, the method comprising:
receiving a torrent identifier for a torrent file from a computing device, the torrent file being associated with content to be processed at the computing device;
searching a data store of the content screening server for torrent rating data associated with the torrent file using the torrent identifier, the torrent rating data indicating characteristics of the content associated with the torrent file; and
transmitting the torrent rating data indicating characteristics of the content associated with the torrent file to the computing device;
wherein, based on the transmitted data, the computing device controls whether to process the content associated with the torrent file at the computing device; and
wherein the torrent rating data is derived by the content screening server aggregating server-specific rating information of the torrent file that has accumulated separately at each of a plurality of external torrent servers that has provided access to the torrent file.

27. A system for screening content associated with a torrent file, the system comprising:
a computing device comprising a processor and a memory storing instructions for screening files during online file transfers; and
a content screening server comprising a data store, the data store having torrent rating data associated with the torrent file, the torrent rating data being derived by the content screening server by aggregating server-specific rating information of the torrent file that has accumulated separately at each of a plurality of external torrent servers that has provided access to the torrent file and used for indicating characteristics of the content associated with the torrent file;
wherein, when the instructions are executed by the processor of the computing device, the processor:
identifies a torrent identifier of the torrent file, the torrent file being associated with content to be processed at the computing device; and
transmits the torrent identifier to the content screening server;
wherein the content screening server:
receives the torrent identifier from the computing device;
searches, using the torrent identifier, for torrent rating data indicating characteristics of the content associated with the torrent file from the data store; and
transmits the torrent rating data indicating characteristics of the content associated with the torrent file to the computing device, and
wherein the instructions stored at the computing device further configure the processor of the computing device to:

based on the torrent rating data received from the content screening server, control whether to process the content associated with the torrent file at the computing device.

\* \* \* \* \*